Jan. 10, 1967 H. M. BLUMENSHINE 3,297,079
COMBINATION COOLING AND SEALED FUEL
COMBUSTION HEATING MEANS
Filed Oct. 12, 1964 2 Sheets-Sheet 2
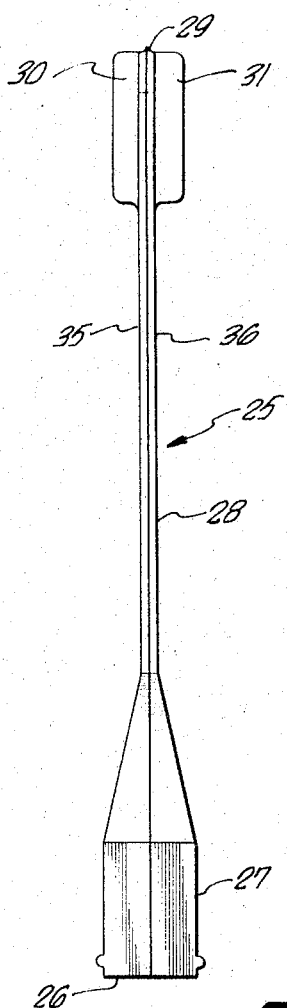
FIG_4_
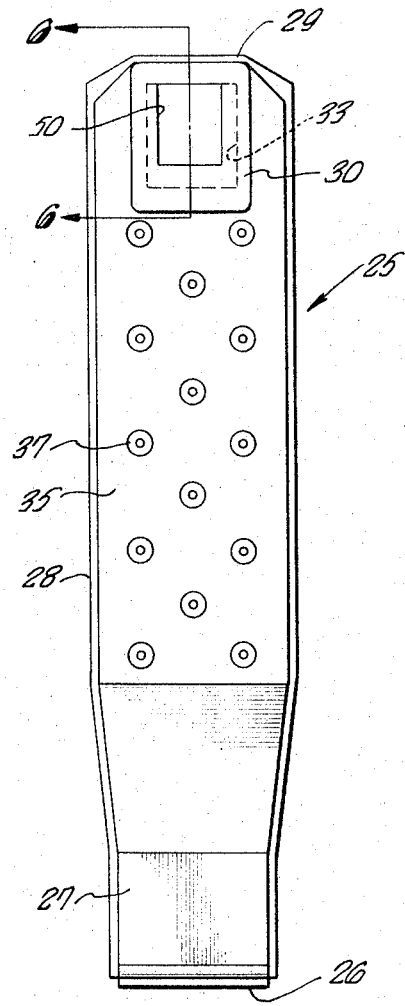
FIG_5_
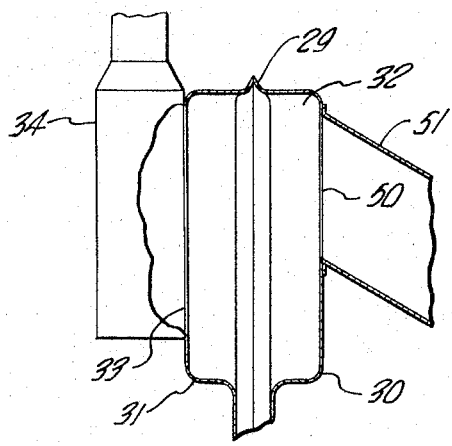
FIG_6_
INVENTOR.
HUGH M. BLUMENSHINE
BY
Christie, Parker & Hale
ATTORNEYS.

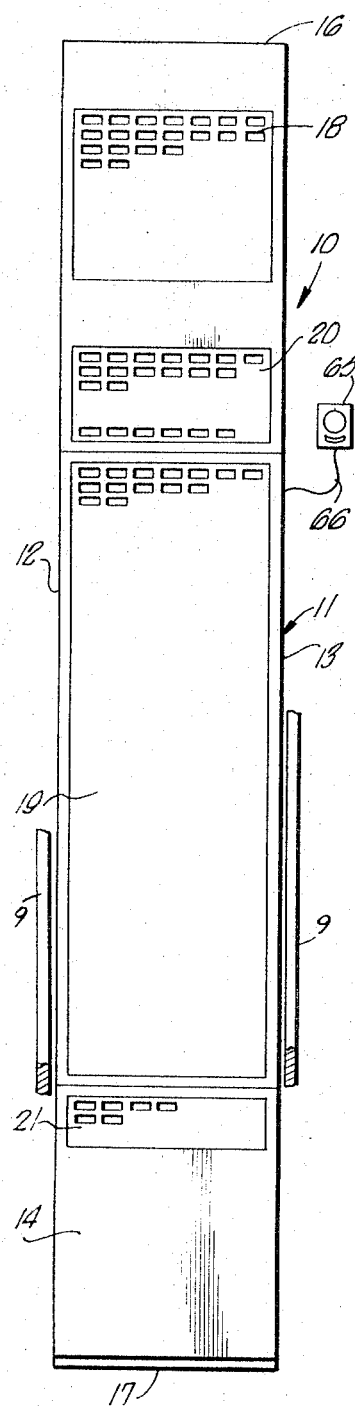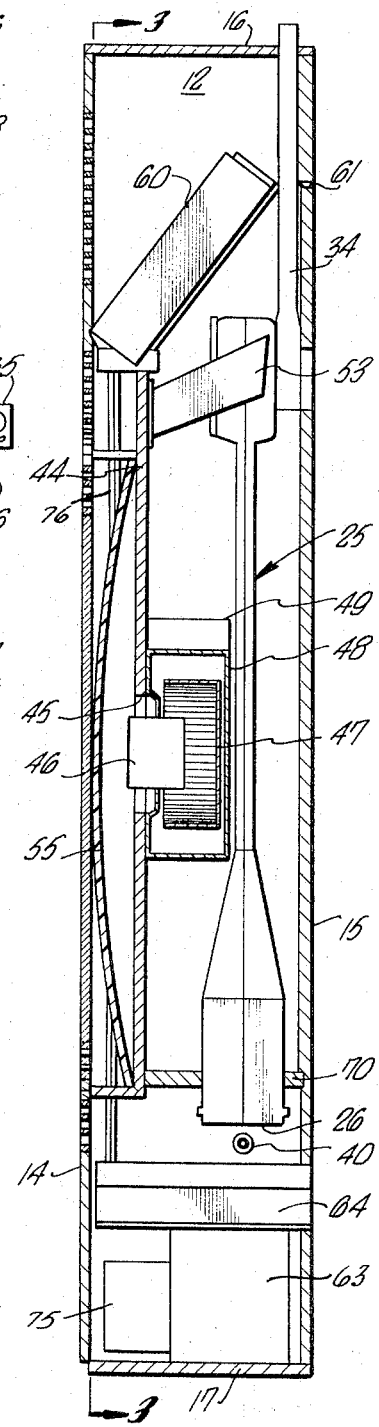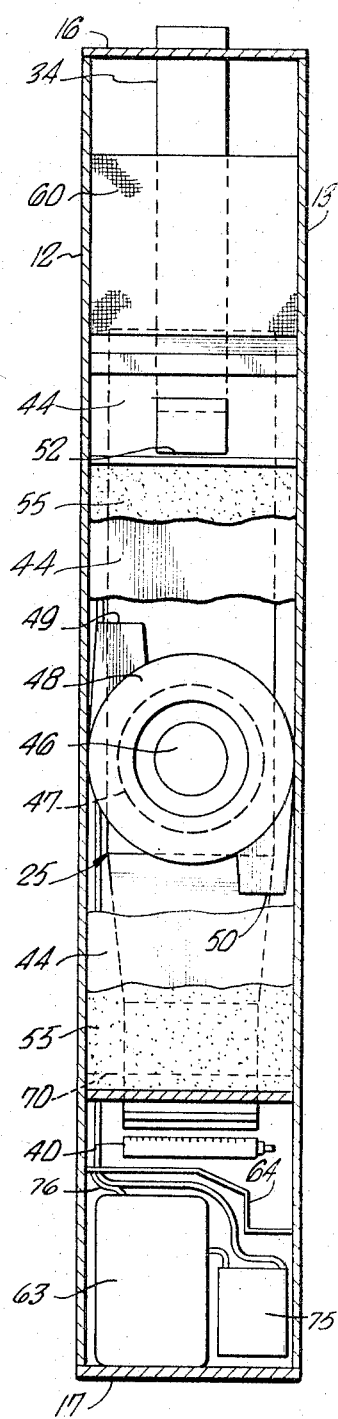

//patents
United States Patent Office 3,297,079
Patented Jan. 10, 1967

3,297,079
COMBINATION COOLING AND SEALED FUEL COMBUSTION HEATING MEANS
Hugh M. Blumenshine, Whittier, Calif., assignor to Lear Siegler, Inc., Grand Rapids, Mich., a corporation of Michigan
Filed Oct. 12, 1964, Ser. No. 402,992
2 Claims. (Cl. 165—27)

This invention relates to air heaters. More particularly, it relates to an improved forced draft air circulation system in a combination air heater and air conditioner adapted to be positioned between two adjacent studs in a wall.

Compact air heaters have been developed which may be disposed between two adjacent studs in the wall of a space to be heated. Such heaters are widely used in apartments, but to be approved for such use the heaters must meet rigid specifications imposed by applicable building codes and fire hazard restrictions. A principal criterion which must be met is that the heater produce a very low increase in temperature, relative to room temperature, at the surfaces of the wooden studs between which the heater is positioned. Such heaters conventionally operate either on gas or fuel oil, and the same criterion must be met regarding the effect on ambient temperature by exhaust gases passing through a flue which is also disposed between the studs. To meet this last criterion, it is necessary to recover as much of the heat released by the fuel as possible—success in meeting this criterion also produces good thermal efficiency of the heater.

Early heaters of the type here considered relied upon low velocity natural convection of air from the space to be heated over a heat exchanger through which passed the hot products of fuel combustion. Because of the low heat transfer rates associated with natural convection, such heaters either were undesirably long along the heat exchanger, or were heavily baffled so that the overall height of the unit could be reduced. Heavily baffled heaters, however, are expensive to construct and tend to become wider than the usual between stud spacing of the structures in which the heaters are installed. To avoid these problems and still meet the design criteria required of this class of heater, blowers were installed in the heaters to provide a forced draft of ambient air through the heater.

Forced draft heaters known before the advent of this invention placed the blower at the lower end of the heat exchanger adjacent the fuel burner. The air discharged from the blower passed upwardly along the vertically oriented heat exchanger parallel to and in the same direction as the flow of hot gases through the heat exchanger. Such an air-flow pattern causes heat to be recovered from the combustion products primarily at the lower end of the heat exchanger with the result that the flue gases are hotter than desired. To correct this condition it is necessary to provide baffles around the upper end of the heat exchanger.

This invention, on the other hand, provides an improved forced draft air circulation system in a heater of the class described. The air circulates over both the upper and lower ends of the heat exchanger so as to provide efficient extraction of heat from the products of combustion in these areas. Accordingly, the temperature of the flue gases is at an acceptable level. This result is accomplished with a minimum of baffling around the heat exchanger. The heater thus is simple and economical to construct.

In brief, then, this invention provides an air heater which includes a vertically elongated casing having a width less than the distance between opposing surfaces of two adjacent wall studs between which the heater is adapted to be disposed. A hollow elongated heat exchanger is oriented vertically in the casing. A fuel burner is disposed in the casing adjacent the lower end of the heat exchanger so that hot gases from the burner pass upwardly through the heat exchanger. A flue is connected to the upper end of the heat exchanger for carrying exhaust gases away from the heater. Air blower means are located in the casing between the upper and lower ends of the heat exchanger. The air blower means intakes air from the exterior of the casing and discharges this air upwardly and downwardly for flow thereof along and around the heat exchanger. The heater also includes baffle means in the casing for directing the discharged air, after flow thereof around the heat exchanger, to the exterior of the casing through an upper front portion of the casing.

The above-mentioned and other features of the invention are more fully set forth in the following detailed explanation of a preferred embodiment of the invention taken in conjunction with the accompanying drawings, wherein:

FIG. 1 is a front elevation view of an air heater and air conditioner according to this invention;

FIG. 2 is a cross-sectional elevation view taken along line 2—2 in FIG. 1;

FIG. 3 is an elevation view of the device shown in FIG. 1 with the front of the casing removed;

FIG. 4 is a side elevation view of a heat exchanger for the device shown in FIG. 1;

FIG. 5 is a front elevation view of the heat exchanger shown in FIG. 4; and

FIG. 6 is an enlarged cross-section view taken along line 6—6 in FIG. 5.

FIG. 1 shows a combination air heater and air conditioner 10 which includes a casing 11 having sides 12 and 13, a front 14, a back 15 (see FIG. 2) and top and bottom surfaces 16 and 17. The casing is generally cubical in configuration and is considerably higher than it is wide. The distance between sidewalls 12 and 13 is less than the distance between the opposing surfaces of a pair of studs 9 which are structural elements in a wall in which the heater is adapted to be recessed. Conventionally, the studs are located on 16 inch centers, and, accordingly, a preferred embodiment of this invention has a width of 14⅛ inches.

The front of casing 10 carries an upper louvered grille 18 through which heated air is discharged from the interior of the casing. The central portion of the front of the casing defines a louvered grille 19 through which air is drawn at low velocity into the casing. A flue vent grille 20 is located in the front of the casing between grilles 18 and 19 and an air inlet grille 21 to the burner element of the heater is located below the blower inlet grille.

FIGS. 2 and 3 show the components disposed in the interior of the casing 11. A hollow elongated heat exchanger 25 (shown in greater detail in FIGS. 4, 5, and 6) is disposed in the casing so as to be spaced from the interior surfaces of the casing but is nearer to the rear of the casing than to the front. The heat exchanger is in the form of a duct having an open lower end 26. A lower portion 27 of the heat exchanger has a rectangular cross-sectional configuration above which the heat exchanger duct decreases in depth (the front-to-back dimension relative to the heater casing) and increases in width to an elongated portion 28 which is considerably wider than it is deep. The heat exchanger has an upper end 29 adjacent which the forward and rear duct surfaces define bosses 30 and 31, respectively, to form an enlarged chamber 32 (see FIG. 6). Rear boss 31 defines an enlarged opening 33 from chamber 32 to the lower end of a flue duct 34 which is secured to boss 31 and which extends upwardly along casing rear wall 15. Flue duct 34 is provided for carrying the products of combustion from the burner element, to be described, away from the heater.

Heat exchanger portion 28 has opposite surfaces 35 and 36 which are dimpled as at 37. The pattern of dimples is identical in both surfaces 35 and 36. The dimples are aligned along 3 rows extending vertically of the heat exchanger. The central portions of the dimples in the middle row are connected, as by spot welding, to the corresponding areas of the dimples formed in the other surface of the heat exchanger. The interior and exterior surfaces of the heat exchanger may be coated with a ceramic material. The interconnection of the middle row of dimples on the opposite surfaces of heat exchanger portion 28 prevents undue movement of these surfaces as the heat exchanger expands and contracts because of thermal influences. This interconnection thus serves to prevent cracking and checking of the ceramic coating.

A fuel burner element 40 is disposed transversely of the casing in a lower portion of the casing. The burner element shown is adapted for use with natural gas or the like, but it is within the scope of this invention that a burner adapted for use with fuel oil may be provided. Heat exchanger 25 is so positioned in the casing that lower end 26 of the exchanger is juxtaposed with burner element 40 so that the products of combustion from the burner element pass upwardly into the heat exchanger.

A motor support plate and baffle 44 is disposed in the casing between the casing front 14 and the heat exchanger. The motor support plate extends parallel to the elongate extent of the heat exchanger and has its ends disposed adjacent the corresponding ends of the heat exchanger. An aperture 45 is formed through a central portion of the motor support plate. An electric blower motor 46 is supported in aperture 45 so that a clearance exists between the motor and the motor support plate around the entire circumference of the motor. The motor is connected to a blower impeller 47. A centrifugal type blower volute or scroll 48 surrounds the impeller as shown in FIG. 2. The volute has a pair of air discharge openings 49 and 50 which open to the upper and lower ends of the heat exchanger, respectively, as shown in FIG. 3. Preferably the volute openings are of equal area so that substantially equal volumes of air are discharged by the blower through each of the openings.

The air which is discharged from the lower volute opening flows downwardly along and around the heat exchanger and then upwardly toward the upper interior portion of the casing. The air discharged from the blower is at approximately ambient temperature and therefore the heat transfer rate from the lower end of the heat exchanger to this air is high. Accordingly, a large portion of the heat present in the gases rising through the heat exchanger is transferred to the air discharge downwardly from volute 48. This means that the temperature of the gases flowing through the major portion of the length of the heat exchanger are sufficiently cool that extensive thermal insulation is not required along the interior surfaces of the casing to meet the specifications of the applicable building codes and fire restrictions. Similarly, the air which is discharged from upper blower opening 49 is at approximately ambient temperature. This air flows along and around the upper portion of the heat exchanger into the upper extent of the casing to be discharged therefrom through grille 18. Since this air is relatively cool, it extracts a large percentage of the heat remaining in the hot gases passing upwardly through the heat exchanger. Accordingly, the gas which enters the flue is at a temperature which is sufficiently low that moderate amounts of insulation are required around the flue in order to meet the above mentioned specifications and criteria.

An opening 50 is formed in front boss 30 of the heat exchanger. A flue vent duct 51 is connected to the heat exchanger to communicate with chamber 32 through opening 50. The flue vent duct also communicates with an opening 52 formed through the upper end of motor support plate 44. Usually the flow of gas through flue 34 is away from the heat exchanger because of the natural draft induced upwardly through the flue by the difference in temperature between the flue gases and the ambient air adjacent the outlet of the flue. Occasionally, however, a gust of wind will cause a backdraft in the flue, which backdraft must be vented from the heat exchanger in order that it not be reflected at the burner element. If this is not done, there is a possibility that the flame at the burner element will be extinguished. In the case of natural gas, such an occurrence is extremely dangerous. Vent duct 51 provides that a backdraft in flue 34 be vented to the exterior of casing 11 before it can be manifested at the burner element.

The sides of the flue vent duct are extended to engage sides of the heat exchanger as at 53. These extensions assist in properly positioning the upper end of the heat exchanger and the flue duct relative to the walls of the casing.

An air filter 55 is disposed adjacent the front of motor support plate 44 behind grille 18. Preferably filter 55 is fabricated from a sheet of a synthetic material marketed under the name "Scottfoam" by the Scott Paper Company.

FIGS. 2 and 3 show an evaporator coil 60 of an air conditioning system disposed in the upper portion of casing 11. The evaporator coil extends between sides 12 and 13 of the casing and connects between the rear surface of casing front 14 and a baffle 61 which extends from the rear of the casing around flue vent 34. Accordingly, all air which is discharged from the blower must pass through the coil prior to the exit of such air from the interior of the casing. A compressor 63 and a refrigerant condenser 75 are located in the casing below burner element 40 and is separated from the burner element by a suitable thermally insulated baffle or partition 64. Refrigerant ducting 76 extends between the evaporator coil and the compressor.

A control unit 65 for heater 10 is provided and is connected to the heater by a cable 66. The control unit is adapted to be mounted on the wall of the space to which the heated air is discharged from the heater, but at a location removed from the heater. The control unit includes a thermostat and a selector switch for selecting between operation of the burner element and the compressor.

Preferably blower motor 46 is a two-speed motor. Control unit 65 also includes a selector switch for selecting between the two speeds of the motor. In a preferred embodiment of this invention, the motor is operated to discharge 600 cubic feet of air per minute when the compressor is operated to provide an air conditioning function of the heater/air conditioner. The blower is operated to discharge 400 cubic feet of air per minute when the burner unit is operated.

The heater described above has several advantages which are directly related to the feature that air is discharged both upwardly and downwardly along the heat exchanger from a blower located intermediate the ends of the heat exchanger. The air flow pattern associated with such an air distribution system provides efficient transfer of the heat contained in the products of combustion of the fuel to the air discharged by the blower. This means that the heat exchanger may be made shorter in length than if the blower were located adjacent the lower end of the heat exchanger and air were passed only upwardly along the heat exchanger. The inner walls of the casing act as baffles for this air flow pattern. The only additional baffling required is provided by motor support plate 44, by baffle 61, and by a burner element shelf 70 to which burner element 40 is mounted and through which the lower end of the heat exchanger passes; these elements, however, perform structural functions in the heater and are not entirely baffles. Accordingly, the structural configuration of heater 10 is exceedingly simple and the heater can be constructed at low cost.

While the invention has been described above in conjunction with specific apparatus and configurations of apparatus, this has been way of example only and is not to be considered as limiting the scope of this invention.

What is claimed is:

1. In an air heater adpated to be disposed between a pair of adjacent standardly-spaced studs in a wall of a habitable structure and the like, the air heater including a vertically elongated casing having a width less than the distance between the opposing surfaces of said studs, partition means disposed in the casing defining upper and lower portions of the casing, a fuel burner disposed in the lower portion of the casing, a hollow elongated heat exchanger disposed in the casing vertically above the fuel burner principally in the casing upper portion in spaced relation to the inner surfaces of the casing with its lower end positioned in the casing lower portion to receive hot gases from the fuel burner, a flue connected to the upper end of the heat exchanger and extending vertically from the casing within an upward extension of the casing sides, the improvement comprising a squirrel cage air blower located substantially midway between the ends of the heat exchanger exteriorly thereof in the casing upper portion forwardly of the heat exchanger and having a pair of outlets opening upwardly and downwardly therefrom, the blower being operable for drawing air from the exterior of the casing and for discharging air in substantially equal volumes upwardly and downwardly therefrom through said outlets, and baffle means in the casing for directing air discharged from the blower means around and along the heat exchanger and from the casing through an upper front portion thereof, said baffle means including the lower portion of the heat exchanger below the blower being reduced in width transversely of the casing relative to the remainder of the length thereof and being increased in depth along a line forwardly and rearwardly of the casing relative to the remainder of the length thereof.

2. In an air heater and air conditioner adapted to be disposed between a pair of adjacent standardly-spaced studs in a wall of a habitable structure and the like, the heater-conditioner including a vertically elongated casing having a width less than the distance between the opposing surfaces of said studs, partition means disposed in the casing defining upper and lower portions of the casing, a fuel burner disposed in the lower portion of the casing, a hollow elongated heat exchanger disposed in the casing vertically above the fuel burner in spaced relation to the inner surfaces of the casing principally in the casing upper portion with its lower end positioned in the casing lower portion in juxtaposition to the fuel burner to receive hot gases from the fuel burner, a flue connected to the upper end of the heat exchanger and extending vertically from the casing between said studs, an evaporator coil disposed in the casing above the heat exchanger, a compressor in the casing below the fuel burner, refrigerant duct means communicating between the compressor and the evaporator coil within the casing, and control means operable to select between operation of the burner and the compressor, the improvement comprising a squirrel cage air blower located substantially midway between the ends of the heat exchanger exteriorly thereof in the casing upper portion forwardly of the heat exchanger and having a pair of outlets opening upwardly and downwardly therefrom, the blower being operable in either setting of the control means for drawing air from the exterior of the casing and for discharging air in substantially equal volumes upwardly and downwardly therefrom through said outlets, and baffle means in the casing for directing air discharged from the blower means around and along the heat exchanger and for directing all of said air over the evaporator coil and from the casing through an upper front portion thereof, said baffle means including the lower portion of the heat exchanger below the blower being reduced in width transversely of the casing relative to the remainder of the length thereof and being increased in depth along a line forwardly and rearwardly of the casing relative to the remainder of the length thereof.

References Cited by the Examiner

UNITED STATES PATENTS

| 2,622,589 | 12/1952 | Tuck | 126—307 |
| 2,773,676 | 12/1956 | Boyle et al. | 165—60 X |
| 2,982,282 | 5/1961 | Fertig | 126—110 |
| 3,073,296 | 1/1963 | Hollingsworth et al. | 126—110 |
| 3,133,535 | 5/1964 | Blumenshine | 126—110 |

FOREIGN PATENTS

| 868,240 | 5/1961 | Great Britain. |

ROBERT A. O'LEARY, *Primary Examiner.*

M. A. ANTONAKAS, *Assistant Examiner.*